United States Patent
Lee et al.

(10) Patent No.: US 7,602,584 B2
(45) Date of Patent: Oct. 13, 2009

(54) MAGNETIC RECORDING HEAD WITH TRAPEZOIDAL LAYERED PORTION AND METHOD OF MANUFACTURING THE SAME

(75) Inventors: Hoo-san Lee, Osan-si (KR); Yong-su Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 11/352,316

(22) Filed: Feb. 13, 2006

(65) Prior Publication Data

US 2006/0215317 A1 Sep. 28, 2006

(30) Foreign Application Priority Data

Mar. 24, 2005 (KR) .................. 10-2005-0024568

(51) Int. Cl.
*G11B 5/147* (2006.01)
(52) U.S. Cl. .............................. 360/125.12; 360/125.13
(58) Field of Classification Search ............ 360/125.08, 360/125.09, 125.1, 125.11, 125.12–125.15, 360/125.24, 125.26
See application file for complete search history.

(56) References Cited

U.S. PATENT DOCUMENTS

| | | | | |
|---|---|---|---|---|
| 5,828,526 A | * | 10/1998 | Kagawa et al. | 360/324 |
| 6,064,552 A | * | 5/2000 | Iwasaki et al. | 360/322 |
| 6,249,406 B1 | * | 6/2001 | Gill et al. | 360/324.11 |
| 6,301,076 B1 | | 10/2001 | Stageberg et al. | |
| 6,304,415 B1 | * | 10/2001 | Tateyama et al. | 360/125.43 |
| 6,477,006 B1 | * | 11/2002 | Sato | 360/125.43 |
| 6,950,277 B1 | * | 9/2005 | Nguy et al. | 360/125.14 |
| 6,952,325 B2 | * | 10/2005 | Sato et al. | 360/125.08 |
| 6,999,270 B2 | * | 2/2006 | Watanabe et al. | 360/78.04 |
| 7,186,348 B2 | * | 3/2007 | Chen et al. | 216/22 |
| 7,239,478 B1 | * | 7/2007 | Sin et al. | 360/125.3 |
| 2002/0039668 A1 | * | 4/2002 | Inomata et al. | 428/694 TM |
| 2002/0080523 A1 | * | 6/2002 | Sato et al. | 360/126 |
| 2002/0176214 A1 | | 11/2002 | Shukh et al. | |
| 2004/0257702 A1 | | 12/2004 | Kimura et al. | |
| 2005/0042480 A1 | * | 2/2005 | Murao et al. | 428/694 TM |
| 2005/0243465 A1 | * | 11/2005 | Lille et al. | 360/126 |
| 2006/0044677 A1 | * | 3/2006 | Li et al. | 360/122 |
| 2006/0103978 A1 | * | 5/2006 | Takano et al. | 360/125 |
| 2006/0171073 A1 | * | 8/2006 | Kobayashi | 360/126 |
| 2007/0151095 A1 | * | 7/2007 | Kobayashi | 029/603.15 |
| 2008/0008909 A1 | * | 1/2008 | Fuji et al. | 428/811.3 |

FOREIGN PATENT DOCUMENTS

| | | |
|---|---|---|
| JP | 2001-236605 A | 8/2001 |
| JP | 2002208112 A | 7/2002 |
| JP | 2004303364 A | 10/2004 |
| JP | 2005018918 A | 1/2005 |

* cited by examiner

*Primary Examiner*—Brian E Miller
(74) *Attorney, Agent, or Firm*—Sughrue Mion, PLLC

(57) ABSTRACT

A magnetic recording head and a method of manufacturing the same are provided. The method includes layering sequentially first magnetic layer and an insulating cap layer on a first insulating layer; forming a mask pattern of a desired width on the insulating cap layer, and etching the first magnetic layer and the insulating cap layer until the first insulating layer is exposed, thereby forming a trapezoidal layered portion; depositing an insulating material on the first insulating layer to form a second insulating layer to bury a periphery of the trapezoidal layered portion; and forming a second magnetic layer on the second insulating layer.

5 Claims, 4 Drawing Sheets

MAGNETIC RECORDING HEAD WITH TRAPEZOIDAL LAYERED PORTION AND METHOD OF MANUFACTURING THE SAME

CROSS-REFERENCE TO RELATED PATENT APPLICATION

This application claims priority from Korean Patent Application No. 10-2005-0024568, filed on Mar. 24, 2005, in the Korean Intellectual Property Office, the disclosure of which is incorporated herein in its entirety by reference.

BACKGROUND OF THE INVENTION

1. Field of the Invention

The present invention relates to a magnetic recording head, and more particularly, to a perpendicular magnetic recording head having a main pole formed in a roughly trapezoidal shape and a method of manufacturing the same.

2. Description of the Related Art

In general, magnetic recording media are classified into a longitudinal magnetic recording medium and a perpendicular magnetic recording medium based on whether a magnetic polarization of a domain is longitudinal or perpendicular. The perpendicular magnetic medium is proper to increase a recording density. The magnetic recording medium is usually provided in a disk shape and a device of recording data thereon is referred as a magnetic head. Such a perpendicular magnetic recording head includes a main write pole for applying a magnetic field to the magnetic recording medium, and a return pole for allowing the applied magnetic field to return. The perpendicular magnetic recording head has a thin film-laminated structure so as to be miniaturized.

In order to increase the magnetic recording density, a track-width of the disk-shaped magnetic recording medium has to be narrow. To this end, it is important to reduce a width of the main pole. However, the magnetic recording head with the conventional laminated structure has a limitation in reducing the width of the main pole due to the restriction in a patterning technique.

A laminated structure of a conventional magnetic recording head and a method of manufacturing the same will now be described briefly with reference to FIGS. 1 through 3. FIG. 1 is a schematic view illustrating a relationship between a trapezoidal main pole and a track width in the prior art. A main pole 10 has a roughly trapezoidal shape when viewing perpendicularly from a recording surface of the magnetic recording medium and a longitudinal end of the magnetic recording head. When the trapezoidal main pole 10 writes a bit data on a selected track, the main pole does not affect an adjacent track even though a skew angle S is maximum. A track width is determined by a width of a first side 10b of the main pole 10 corresponding to a long side of a trapezoidal cross section. Specifically, when the skew angle S is 0°, a maximum track width $W_1$ is equal to the width of the first side 10b of the trapezoidal main pole 10. Wherein, the first side 10b corresponding to a long side of the trapezoid is in parallel with a second side 10a corresponding to a short side.

FIG. 2 is a cross-sectional view illustrating a laminated structure of a conventional magnetic recording head. FIG. 2 shows a longitudinal end of the magnetic recording head facing a magnetic recording medium. The magnetic recording head includes a first insulating layer 21, a second insulating layer 22, a third insulating layer 23, and a return pole layer 30. The second insulating layer 22 is formed with a slit having a trapezoidal cross section. The slit is filled with a magnetic material to form a trapezoidal main pole 10.

FIGS. 3A through 3D are cross-sectional views illustrating a method of manufacturing the conventional magnetic recording head. First, as shown in FIG. 3A, the first insulating layer 21 and a main pole layer 10' are sequentially deposited, and a photoresist pattern 80 is formed on the main pole layer 10'. The photoresist pattern 80 is a line pattern having a desired width. A minimum value of the width of the photoresist pattern is determined by a photolithography technique to pattern the photoresist.

Next, as shown in FIG. 3B, the main pole layer 10' is isotropically etched until the first insulating layer 21 is exposed. Hence, the trapezoidal main pole 10 is formed under the photoresist pattern 80. At this time, the trapezoidal main pole 10 has a width of a long side that is equal to that of the photoresist pattern 80.

Next, as shown in FIG. 3C, the second insulating layer 22 is formed on the first insulating layer 21. The insulating material is deposited on the entire surface of the first insulating layer until both sides of the main pole 10 are buried. The insulating material deposited on an upper portion of the trapezoidal main pole 10 may be removed together with the photoresist pattern through a lift-off technique. Alternatively, the photoresist pattern is removed by a stripper, and then, after the insulating material is deposited on the entire surface, the insulating material covering the upper portion of the main pole 10 is polished. And, as shown in FIG. 3D, the third insulating layer 23 is formed on the main pole 10 and the second insulating layer 22, and the return pole layer 30 of the magnetic material is formed on the third insulating layer 23.

The width of the photoresist pattern 80 which can be formed by a conventional photolithographic equipment is about 100 nm at least. As described above, the width $W_1$ of the photoresist pattern 80 is equal to the width of the first side 10b of the trapezoidal main pole 10. This means that the magnetic recording medium with the conventional laminated structure has a limitation that the minimum value of the track width is about 100 nm.

In order to more increase the recording density of the magnetic recording medium, there is a demand for a new structure that can reduce a width of a trapezoidal main pole using an existing process equipment.

SUMMARY OF THE INVENTION

The present invention provides a magnetic recording head having a laminated structure and a method of manufacturing the same, which can remarkably reduce a track width of a magnetic recording medium using an existing process equipment.

According to an aspect of the present invention, there is provided a magnetic recording head including a laminated structure having a main pole and a return pole, wherein the laminated structure comprises a trapezoidal layered portion formed in an insulating layer having a first magnetic portion adjacent to a bottom side of the trapezoidal layered portion, and an insulating cap portion adjacent to a top side of the trapezoidal layered portion; and a second magnetic layer disposed adjacent to the trapezoidal layered portion and insulated from the first magnetic portion.

The first magnetic portion may function as a main pole for applying a magnetic field to a magnetic recording medium, while the second magnetic layer functions as a return pole for allowing the applied magnetic field to return. The insulating cap may function as a write gap for insulating the first magnetic portion and the second magnetic layer to increase stability of magnetic recording.

According to another aspect of the present invention, there is provided a method of manufacturing a magnetic recording head including a laminated structure having a main pole and a return pole wherein the method comprises layering sequentially first magnetic layer and an insulating cap layer on a first insulating layer; forming a mask pattern of a desired width on the insulating cap layer, and etching the first magnetic layer and the insulating cap layer until the first insulating layer is exposed, thereby forming a trapezoidal layered portion; depositing an insulating material on the first insulating layer to form a second insulating layer to bury a periphery of the trapezoidal layered portion; and forming a second magnetic layer on the second insulating layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully hereinafter with reference to the accompanying drawings, in which exemplary embodiments of the invention are shown. This invention may, however, be embodied in many different forms and should not be construed as being limited to the embodiments set forth herein. These embodiments are provided so that this disclosure will be thorough and complete, and will fully convey the scope of the invention to those skilled in the art. Like numbers refer to like elements throughout the specification.

Figure 4:
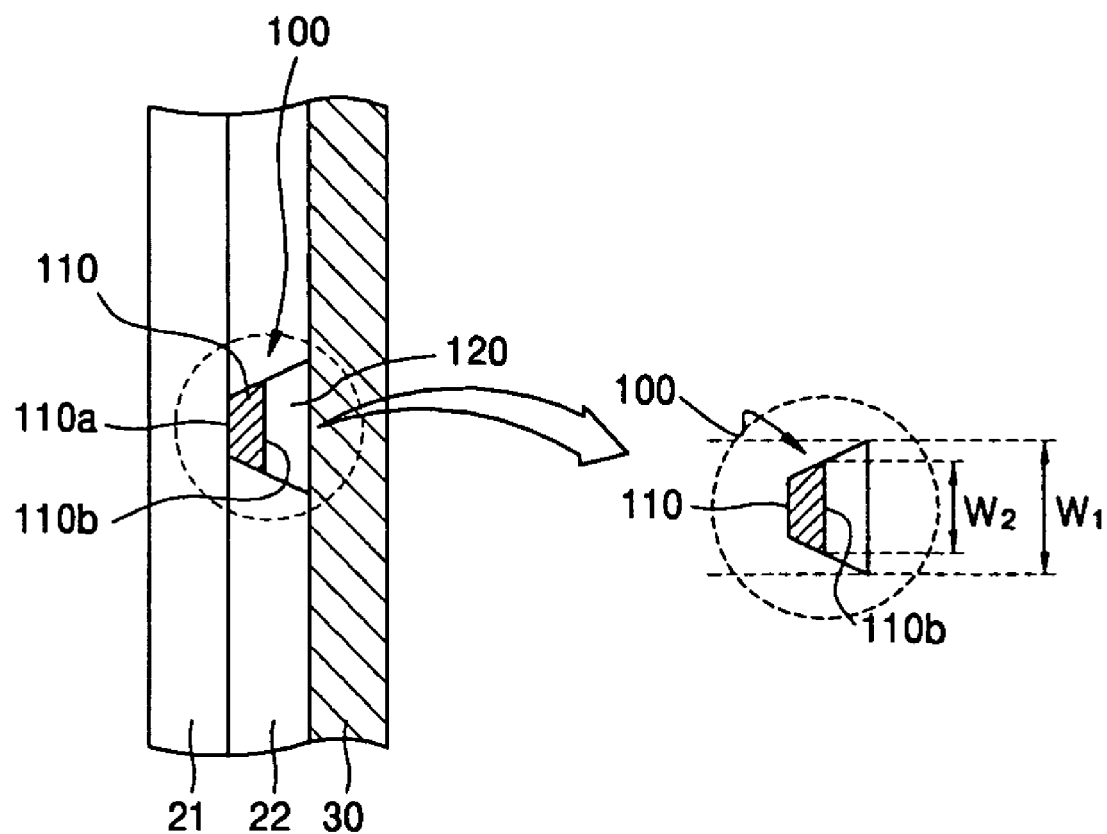
FIG. 4 is a cross-sectional view illustrating a laminated structure of a magnetic recording head according to an embodiment of the present invention.

A magnetic recording head according to the present invention will now be described in detail with reference to the accompanying drawings. FIG. 4 is a cross-sectional view illustrating a laminated structure of the magnetic recording head according to an embodiment of the present invention, in which a track width of the magnetic recording head according to the present invention and that of a conventional magnetic recording head are comparatively shown.

Figure 1:
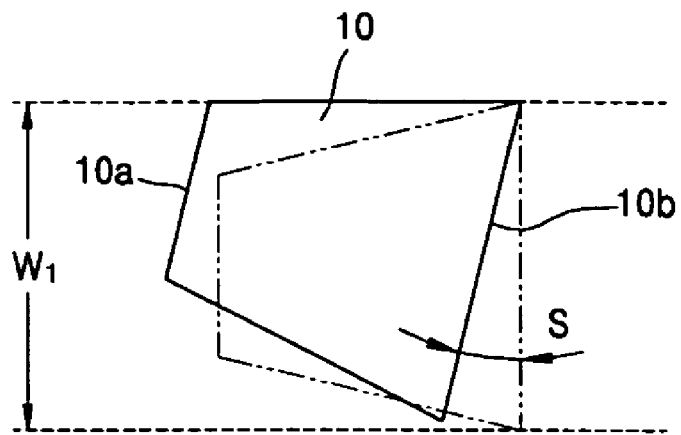
FIG. 1 is a schematic view illustrating a relationship between a trapezoidal main pole and a track width in the prior art.
Figure 2:
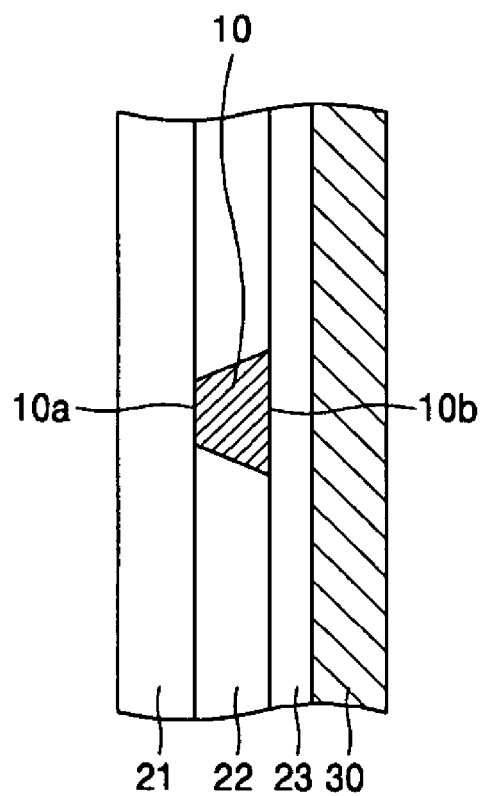
FIG. 2 is a cross-sectional view illustrating a laminated structure of a conventional magnetic recording head.

Referring to FIG. 4, the laminated structure of the magnetic recording head according to the present invention includes a first insulating layer 21, a second insulating layer 22 and a second magnetic layer 30. The second insulating layer 22 is formed with a slit having a trapezoidal cross section. The slit is provided with a trapezoidal layered portion 100 consisting of a plurality of layers therein. The trapezoidal layered portion 100 includes a first magnetic portion 110 layered adjacent to a bottom side of the trapezoidal layered portion 100, and an insulating cap portion 120 formed adjacent to a top side of the trapezoidal layered portion 100. Specifically, the first magnetic portion 110 is layered on the short side of the trapezoidal layered portion 100. Therefore, the first magnetic portion 110 has a small trapezoidal shape in relation to that of the conventional trapezoidal main pole 10 shown in FIG. 2.

In particular, the first magnetic portion 110 has a first side 110$b$ of a width $W_2$ corresponding to the long side of the trapezoidal cross section. Hence, if a size of the trapezoidal layered portion 100 is equal to that of the conventional trapezoidal main pole 10, the width $W_2$ of the first side is remarkably smaller than the width $W_1$ of the first side of the conventional trapezoidal main pole 10. A geometrical property of the trapezoid may be easily understood by those skilled in the art. With the structural characteristic, the magnetic recording head according to the embodiment of the present invention can significantly reduce the track width of the magnetic recording head.

Herein, the first magnetic portion 110 and the second magnetic layer 30 are made of a soft magnetic material which is magnetized by an effect of external magnetic field resulted from electromagnetic induction. The magnetic recording head according to this embodiment may be made of, for example, permalloy (NiFe) that is generally used in the art. Since the first magnetic portion 110 functions as a main pole of which a narrow cross-sectional area is concentrated with the magnetic field, the first magnetic portion 110 could be made of a material having a higher saturated magnetic flux density (i.e., value Bs) than that of the second magnetic layer 30.

The first insulating layer 21, the second insulating layer 22, and the insulating cap portion 120 may be made of an insulating material comprising oxide such as $Al_2O_3$. Any other suitable materials, such as oxides, nitrides, or the like, which is generally used for the insulating material, may be employed.

The magnetic field induced by the first magnetic portion 110 corresponding to the main pole passes through a recording layer (not shown) of the magnetic recording medium and a soft underlayer (not shown) located under the recording layer, and returns to the second magnetic layer 30 corresponding to the return pole. At this time, a region corresponding to the first magnetic portion 110 having the high magnetic flux within the recording layer is magnetically polarized into two different orientations, thereby recording data bit.

A method of manufacturing the magnetic recording head according to an embodiment of the present invention will now be described. FIGS. 5A through 5D are cross-sectional views illustrating the method of manufacturing the magnetic recording head according to the embodiment of the present invention.

Figure 3A:
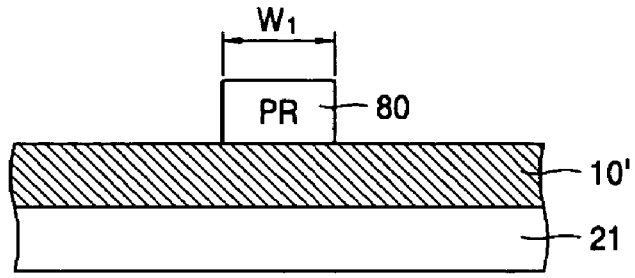
FIGS. 3A through 3D are cross-sectional views illustrating a method of manufacturing the conventional magnetic recording head.
Figure 3B:
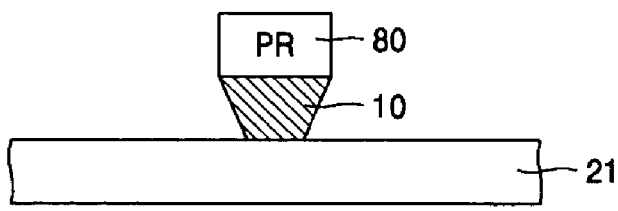
Figure 3C:
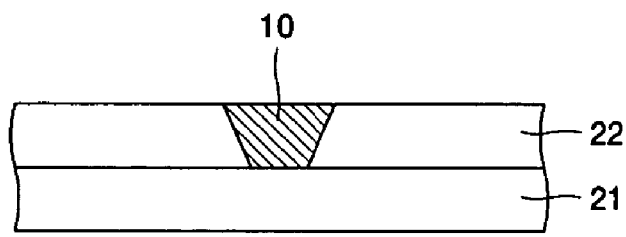
Figure 3D:
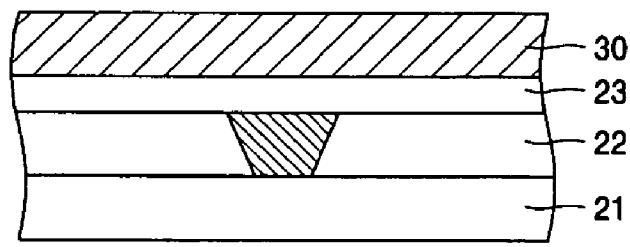
Figure 5A:
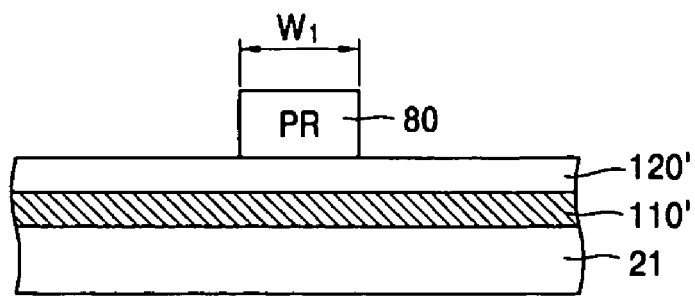
FIGS. 5A through 5D are cross-sectional views illustrating a method of manufacturing a magnetic recording head according to an embodiment of the present invention.

First, as shown in FIG. 5A, the first insulating layer 21, the first magnetic layer 110', and the insulating cap layer 120' are sequentially deposited through any existing deposition technique such as sputtering, electroplating, vacuum plating, atomic layer deposition, or the like. A thickness of the first insulating layer 21 is controllable to units of nanometers or subnanometers. A thickness of the insulating cap layer 120' corresponds to a write gap of the magnetic recording head. In order to more apparently represent differences between the present invention and the prior art, a total of a thickness of the first magnetic layer 110' and a thickness of the insulating cap layer 120' shown in FIG. 5A is equal to that of the main pole layer 10' shown in FIG. 3A.

A mask pattern 80 is formed on a surface of the insulating cap layer 120'. The mask pattern 80 is a photoresist pattern formed by a photolithography technique which patterns a photoresist. In order to minimize the track width of the magnetic recording medium, the mask pattern 80 could have a minimum width that can be provided by an existing photolithography technique.

Figure 5B:
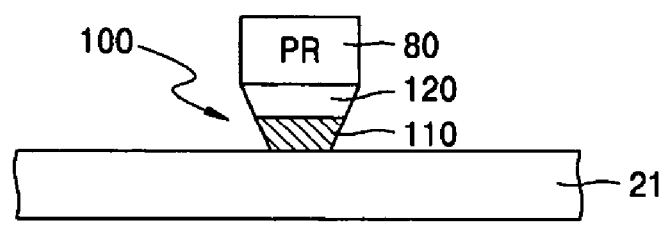

Next, as shown in FIG. 5B, the upper surface of the laminated structure is etched through an wet/dry etching process until the first insulating layer 21 is exposed. For example, in the case of implementing the wet etching, the insulating cap layer 120' and the first magnetic layer 110' are etched by use of a desired etchant (for example, citric acidic peroxodisulphate etchant). As a result, the trapezoidal layered portion 100 is formed under the mask pattern 80. The trapezoidal layered portion 100 may be obtained by use of, for example, ion milling.

Figure 5C:
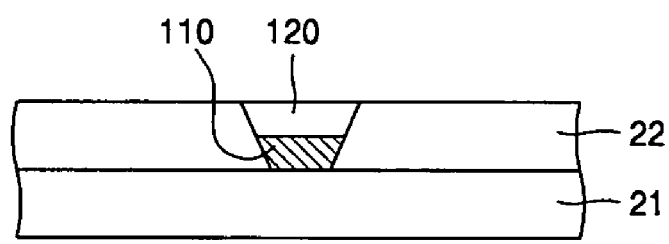

Next, as shown in FIG. 5C, the second insulating layer 22 is formed on the first insulating layer 21. Before the photoresist pattern is removed, the insulating material is deposited on the entire surface of the first insulating layer until both sides of the trapezoidal layered portion are buried. The insulating material deposited on an upper portion of the trapezoidal layered portion may be removed together with the photoresist pattern through a lift-off technique. Alternatively, the photoresist pattern is removed by a stripper, and then, after the insulating material is deposited on the entire surface, the insulating material covering the upper portion of the trapezoidal layered portion is polished.

Figure 5D:
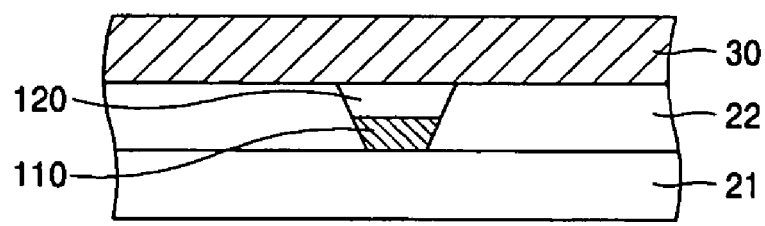

Finally, as shown in FIG. 5D, the second magnetic layer 30 is formed on the trapezoidal layered portion and the second insulating layer 22. The second magnetic layer 30 is adapted to have a large cross-sectional area relative to the first magnetic portion 110 so as to lower the magnetic flux than that of the first magnetic portion 110 when the data bit is recorded on the magnetic recording medium. The second magnetic layer 30 may be made of a material having a lower saturated magnetic flux density than that of the first magnetic portion 110.

As described above, the method of manufacturing the magnetic recording head according to the present invention may be implemented by an existing process equipment.

With the above description, the present invention can provide the magnetic recording head and the method of manufacturing the same which can significantly reduce the track width of the magnetic recording head using the existing process equipment, since the present invention utilizes a geometrical property of the trapezoidal main pole.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A magnetic recording head including a laminated structure having a main pole and a return pole, the laminated structure comprising:
    a trapezoidal layered portion formed in an electrically insulating layer having a first magnetic portion adjacent to a bottom side of the trapezoidal layered portion and an electrically insulating cap portion adjacent to a top side of the trapezoidal layered portion, wherein a top side of the first magnetic portion directly contacts a bottom side of the electrically insulating cap portion; and
    a second magnetic layer disposed adjacent to the trapezoidal layered portion and electrically insulated from the first magnetic portion.

2. The magnetic recording head according to claim 1, wherein the second magnetic layer is formed adjacent to the electrically insulating cap adjacent to the top side of the trapezoidal layered portion.

3. The magnetic recording head according to claim 1, wherein the first magnetic portion is made of a material having a higher saturated magnetic flux density than that of the second magnetic layer.

4. The magnetic recording head according to claim 1, wherein the top side of the trapezoidal layered portion is parallel to the bottom side of the trapezoidal layered portion.

5. The magnetic recording head according to claim 1, wherein the top side of the trapezoidal layered portion is larger than the bottom side of the trapezoidal layered portion.

* * * * *